United States Patent [19]

Adrian

[11] 3,913,101

[45] Oct. 14, 1975

[54] SUB-CARRIER PROXIMITY FUZE SYSTEM

[75] Inventor: Donald J. Adrian, Arlington, Calif.

[73] Assignee: The United States of America as represented by the Secretary of the Navy, Washington, D.C.

[22] Filed: Dec. 15, 1958

[21] Appl. No.: 780,639

[52] U.S. Cl. .................... 343/7 PF; 343/12; 343/14
[51] Int. Cl.² .......................................... G01S 9/39
[58] Field of Search ................ 343/7, 14, 8, 9, 13.1, 343/12, 13, 7 PF, 12 R

[56] References Cited

UNITED STATES PATENTS 2,634,413 4/1953 Potter .................................... 343/8

*Primary Examiner*—Malcolm F. Hubler
*Attorney, Agent, or Firm*—Richard S. Sciascia; Joseph M. St. Amand

EXEMPLARY CLAIM

1. An AM fuze system comprising means for transmitting a signal having a carrier amplitude modulated by a noise modulated sideband signal, means for mixing said transmitted signal with a return echo signal from a target and means for deriving an output to actuate a fuze from the output of said mixing means.

6 Claims, 5 Drawing Figures

INVENTOR.
DONALD J. ADRIAN
BY
ATTORNEY

SUB-CARRIER PROXIMITY FUZE SYSTEM

The invention described herein may be manufactured and used by or for the Government of the United States of America for governmental purposes without the payment of any royalties thereon or therefor.

This invention relates to a fuze system and more particularly to an AM suppressed sub-carrier fuze system using the side bands of a noise modulated suppressed sub-carrier signal to amplitude modulate the transmitted wave of the fuze transmitter whereby the range cut-off techniques of noise modulated FM fuze system is obtained at frequencies not available to an FM system.

In one type of the prior frequency modulated fuze systems, a sinusoidal frequency modulation has been utilized to give some range attenuation but the range cutoff is very poor and ambiguous because of the repetitive nature of the Bessel term which forms the modulus of the fuze range function. By substituting noise as the modulating function in a frequency modulated fuze system, such as the system disclosed in the copending application of Whiteley and Adrian for a Random FM Autocorrelation Fuze System, Ser. No. 566,318 filed Feb. 17, 1956, a monotonic range characteristic is derived which provides a rapid unambiguous range cutoff. Since modulating in frequency may not conveniently be done in the lower carrier frequencies of a transmitted signal in a radio fuze system, the FM systems are not practical in the VHF regions.

The fuze system of the present invention provides the rapid unambiguous range cutoff by amplitude modulation in the radio frequency regions not obtainable by either the prior periodic and sinusoidal frequency modulation systems or the FM systems using noise, such as the Whiteley and Adrian application mentioned above.

It is an object of the present invention, therefore, to provide a fuze system for a missile having a rapid and unambiguous range cutoff in the range function.

Another object of the invention is to provide amplitude modulation of a radio fuze system carrier wave whereby a rapid and unambiguous range cutoff is obtained in the VHF regions.

Another object of the invention is to provide an AM range determining system having an unambiguous and monotonic decreasing range characteristic.

A still further object of the present invention is to provide a fuze system which can be utilized in close proximity to a surface such as the ocean without receiving spurious signals from sea return which will trigger the fuze prematurely.

Other objects and many of the attendant advantages of this invention will be readily appreciated as the same becomes better understood by reference to the following detailed description when considered in connection with the accompanying drawings wherein.

In the formulas for both the FM and AM systems discussed below the average angular frequency for the modulated carrier wave from the transmitter is $\omega_o$ at a peak voltage of $V_o$ and $\tau$ is the time required for the transmitted wave to travel to the target and back. K includes space attenuation and target-reflecting properties in the frequency modulation range function while D (in radians) represents the rms deviation of the oscillator while in the AM system of the present invention $\sigma$ is the standard deviation of the oscillator when modulated by a noise $\psi(t)$ with a Gaussian power spectrum.

An AM counterpart of the basic FM system disclosed by Whiteley and Adrian would not provide a range function which would be useful for fuzing purpose in a guided missile fuzing system because when an RF wave of angular frequency $\omega_o$ is amplitude-modulated by a random noise voltage $V_{m(t)}$ the transmitted signal is $$V_t = A_o\ [1 + kV_m\ (t)\ e^{\ j\omega_o}\ t]$$

and the autocorrelation function would be $$R(\tau) = A_o \cos \omega_o \tau\{1 + K^2\ [V_n(t)\ V_n\ (t-\tau]\}$$

The range function thus defined contains a constant factor that renders it useless in a fuze system. Therefore, the modulation process in an AM system must be one that eleminates the carrier component with which the constant factor is associated. One AM system would be a transmitted signal with a suppressed carrier modulated wave; however, the physical implementation of such a fuze system is considerably more complex than the present FM systems and generation of a wave with a high degree of carrier suppression would be difficult to accomplish.

Figure 1:
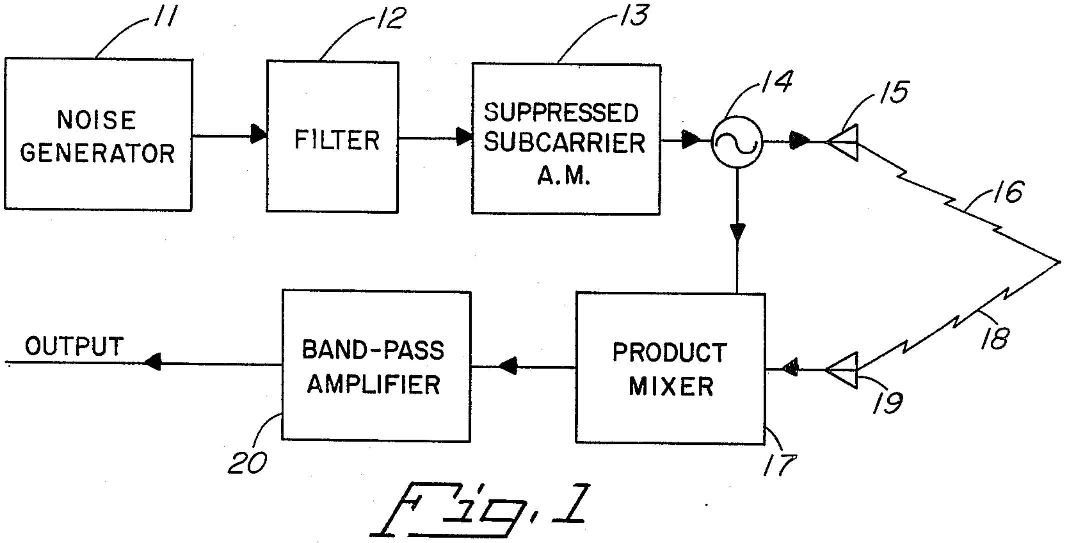
FIG. 1 is a block diagram illustrating one preferred embodiment of the invention.

The present invention provides the carrier-suppression technique to a subcarrier which in turn is employed to amplitude modulate the carrier of the fuze transmitted wave. With particular reference to FIG. 1 the present invention comprises a fuze system assumed to be mounted in a missile which is guided on a path to approach a target with the RF energy from the fuze being transmitted toward the target and a return echo signal being received therefrom. In Block 11 a band of white noise is generated which is passed through a filter 12, preferably of the Gaussian type although a conventional filter could be used if designed to give a good range cut-off as hereinafter described.

The band of white noise which is passed through the filter 12 is utilized to modulate the RF carrier in the subcarrier oscillator 13 wherein any conventional means (not shown) is used to suppress the RF carrier of oscillator 13. The two sidebands of the noise modulated RF signal of oscillator 13 are then utilized to amplitude modulate the RF carrier of the transmitter 14 which transmits the noise modulated AM signal in the direction of the target through the antenna 15. The transmitted wave 16 can be presented by the formula $$V_t = V_o\ [1 + \psi(t) \sin \omega_m t]\ \cos \omega_o t$$

and the suppressed carrier signal is represented by the well known $\Psi(t) \sin \omega_m t$, where $\Psi(t)$ is the filtered noise waveform and where $\omega_m$ is the subcarrier frequency. The suppressed carrier signal is used to amplitude modulate the carrier $\Psi_o$ giving the formula above.

A portion of the transmitted energy from the transmitter 15 is applied to a product mixer 17 where it is combined with the return signal 18 from the target (not shown) which has been modified by the doppler effect due to the relative movement between the missile and the target and is received through the antenna 19 and applied to the product mixer 17.

Figure 3:
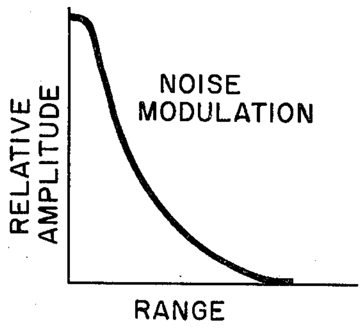
FIG. 3 is a diagram illustrating the relative amplitude of the response from a target with respect to range of a noise modulated AM fuze system utilizing a Gaussian filter.

The output from the product mixer 17 is in the form: $V_m = V_t V_{t-}$ = product of the formula for $V_t$ above and the same formula with $t$ replaced by $(t-\tau)$, i.e. a wave delayed by propogation roundtrip time, where $$\tau = \frac{\text{twice the range}}{\text{velocity of light}};$$

then, $$V_m = \frac{KVo^2}{2}\left\{1 + \psi(t) \sin \omega_m t + \psi(t-\tau) \sin \omega_m (t-\tau) + \right.$$

$$\left. 1/2\, \psi(t)\, \psi(t-\tau)\, [\cos \omega_m \tau - \cos (2\omega m t - \omega_m \tau)] \right\} \cos \omega_o \tau$$

wherein the doppler frequency components of this signal have a constant term and thus will not produce a decreasing range function capable of discriminating between targets having relative small space separation. The output from the product mixer 17, therefore, is passed through a band pass amplifier 20 which is centered at twice the modulation frequency of the transmitted signal 16 and integrates the envelope of the output from the mixer 17 which is in the form $$V = \frac{KVo^2}{4}\overline{\psi(t)\,\psi(t-\tau)} \cos \omega_o \tau$$

which for a noise passed through a Gaussion filter provides a range function of the form $$V(\tau) = \frac{KVo_e^2}{4} \sigma^2\, \tau^2 \cos \omega_o \tau$$

which is the range function shown in FIG. 3.

This output from the band pass amplifier goes to the detonation circuit of the fuze (not shown) and when it reaches a suitable level on the relative amplitude curve of FIG. 3 it provides a trigger signal for firing the detonation circuit to explode a warhead (not shown).

If desired, a fixed delay (not shown) could be inserted between the oscillator 14 and the product mixer 17 to make the fuze signal peak at a desired range. Also one antenna could obviously be used for both transmitting and receiving but the systems illustrated using separate antennas is preferred.

The range function set forth above is similar to the range function disclosed in FIG. 3 of the Whiteley and Adrian application wherein the output from the low pass filter 17 is in the form of $$V(\tau) = KV_o e^{-\upsilon^2 \tau^2 / 2} \cos \omega_o \tau$$

Therefore, the range relation in both the FM system disclosed by Whiteley and Adrian and the AM system of the present invention use noise as the modulating function to produce a monotonically decreasing function of range which satisfies the requirement for discrimination between targets having relatively small space separation.

Figure 2:
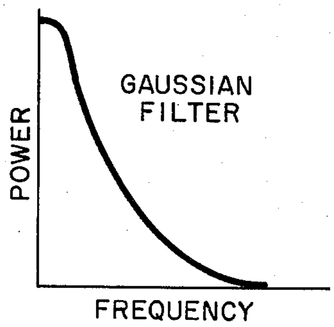
FIG. 2 is a diagram illustrating the relative power output with respect to frequency of a Gaussian filter.
Figure 4:
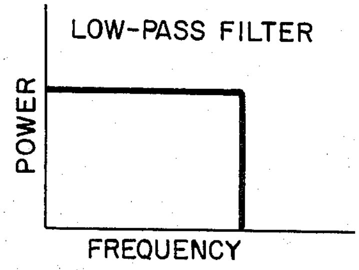
FIG. 4 is a diagram illustrating the relative power output of a low pass filter with respect to frequency.
Figure 5:
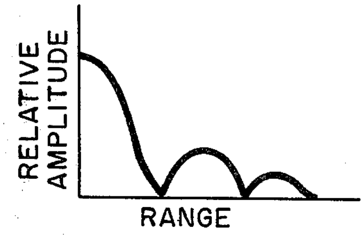
FIG. 5 is a diagram similar to FIG. 3 illustrating the relative amplitude of the response from a target with respect to range of a noise modulated AM fuze system utilizing a low pass filter.

With reference to FIGS. 2 and 3 the range function is shaped into the desired wave shown in FIG. 3 whenever the filter 12 shapes the noise from the generator 11 into a Gaussian power spectrum. If a low pass filter is used as filter 12 the power spectrum is substantially as illustrated in FIG. 4 and the range function of such a system would be as shown in FIG. 5 and would have some of the same undesirable features found in the sinusoidal modulation systems wherein a series of signals will be received at different ranges which are ambiguous and do not provide a sharp range cutoff. Since a low pass filter can be designed to give some power attenuation as the frequency increases it is possible to provide a filter that would give a power spectrum somewhere between the spectrums shown in FIGS. 2 and 4 with a range function approximating the desired range cutoff of FIG. 3.

Obviously many modifications and variations of the present invention are possible in the light of the above teachings. It is therefore to be understood that within the scope of the appended claims the invention may be practiced otherwise than as specifically described.

What is claimed:

1. An AM fuze system comprising means for transmitting a signal having a carrier amplitude modulated by a noise modulated sideband signal, means for mixing said transmitted signal with a return echo signal from a target and means for deriving an output to actuate a fuze from the output of said mixing means.

2. A fuze system comprising a white noise source adapted to produce a random noise waveform with a flat power spectrum, a filter connected with said noise source and operable to pass a band noise said noise from source, means for modulating the RF carrier of a sub-carrier oscillator with a band of noise from said noise source and means for suppressing said RF carrier whereby side bands modulated by said noise source are produced, means for amplitude modulating a carrier frequency of a transmitter with said side bands and transmitting a signal in the direction of a target, means operable to mix a portion of said transmitted signal and a return signal from a target and amplifying means operable to pass the second harmonic of said sideband modulating frequency from the output of said mixer for actuating a fuze.

3. A fuze system comprising means for transmitting a signal, means for modulating the amplitude of the carrier of said signal, means for mixing a portion of said transmitted signal with a return echo signal from a target, means for deriving an output operable to actuate a fuze from the output of said mixing means, and said modulating means includes a white noise generator, filter means connected with said white noise source and operable to shape said noise into a Gaussian power spectrum, means for modulating an RF carrier by the output of said filter; and means for suppressing said modulated carrier whereby the sidebands of said suppressed carrier amplitude modulate said transmitted signal.

4. A missile fuze system having a sharp unambiguous range cutoff and providing discrimination between targets having relatively small space separation comprising a signal transmitting and receiving means, means for amplitude modulating the transmitted carrer frequency of said transmitting means by sidebands of a suppressed subcarrier noise modulated signal, means for mixing a portion of the transmitted signal with a return echo signal from a target and means for passing and amplifying the second harmonic of the modulating frequency from said mixing means signal whereby a sharp and unambiguous output is provided for actuating a fuze.

5. The fuze system of claim 4 in which said means for amplitude modulation comprises a noise generating means, filter means connected with said noise generating means and operable to shape said noise into a Gaussion power spectrum, means for modulating the RF carrier of said subcarrier signal, means for suppressing said modulated RF carrier whereby the sidebands of said noise modulated RF carrier amplitude modulate the RF carrier of said transmitting means.

6. A fuze system comprising means for transmitting a signal, means for modulating the amplitude of the carrier of said signal, means for mixing a portion of said transmitted signal with a return echo signal from a target, and means for deriving an output operable to actuate a fuze from the output of said mixing means, said last mentioned means comprising a bandpass amplifier tuned to the second harmonic of the modulating frequency connected with said mixing means and receiving the output therefrom, whereby the second harmonic of the modulating frequency is amplified to provide a firing signal to actuate said fuze.

* * * * *